United States Patent [19]

Aiello et al.

[11] Patent Number: 5,420,928
[45] Date of Patent: May 30, 1995

[54] PSEUDO-RANDOM GENERATOR

[75] Inventors: William A. Aiello, Madison; Ramarathnam Venkatesan, Morristown, both of N.J.

[73] Assignee: Bell Communications Research, Inc., Livington, N.J.

[21] Appl. No.: 186,208

[22] Filed: Jan. 25, 1994

[51] Int. Cl.⁶ .............................................. H04L 9/00
[52] U.S. Cl. ........................................ 380/46; 380/29; 364/224.21; 364/717
[58] Field of Search ............... 380/46, 29; 364/224.21, 364/717; 331/78

[56] References Cited

U.S. PATENT DOCUMENTS

| | | | |
|---|---|---|---|
| 4,316,055 | 2/1982 | Feistel | 380/29 |
| 4,654,480 | 3/1987 | Weiss | 380/48 |
| 5,297,207 | 3/1994 | Degele | 380/46 |

OTHER PUBLICATIONS

O. Goldreich et al., "A Hard–Core Predicate for all One–Way Functions," 1989, ACM, pp. 25–31.
M. Blum and S. Micali, "How to Generate Cryptographically Strong Sequences of Pseudo–Random Bits," Society for Industrial and Applied Mathematics, vol. 13, No. 4, Nov. 1984, pp. 850–864.
O. Goldreich et al., "How to Construct Random Functions," Journal of the Association for Computing Machinery, vol. 33, No. 4, Oct. 1980, pp. 792–807.
A. Yoo, "Theory and Applications of Trapdoor Functions," 1982, IEEE, pp. 80–91.

Primary Examiner—David C. Cain
Attorney, Agent, or Firm—Leonard Charles Suchyta; Loria B. Yeadon

[57] ABSTRACT

Methodology and concomitant circuitry to generate cryptographically strong pseudo-random bit streams utilize secure block cypher encoders. Typically, each block cypher encoder has a first seed and a random key as an input. In the most basic realization of the methodology and circuitry, the output of each encoder is fed back to connect to its input. The first seed serves as the initial input, and each subsequent input is the immediate output. Each bit in the cryptographically strong pseudo-random bit stream is related to an inner product between each input to the encoder and a second seed.

31 Claims, 3 Drawing Sheets

PSEUDO-RANDOM GENERATOR

FIELD OF THE INVENTION

This invention relates generally to pseudo-random bit generators and, more specifically, to circuitry and concomitant methodology for generating cryptographically strong pseudo-random bits.

BACKGROUND OF THE INVENTION

A very large number of important processes and methods use an auxiliary input which is assumed to be truly random. Examples of such processes and methods include sorting, simulation and testing of complex systems, encryption, and many other cryptographic primitives. Producing a truly random auxiliary input of sufficient length is difficult. Typically, the auxiliary input is produced by a pseudo-random bit generator. Informally, a pseudo-random bit generator is any process or method which takes a short truly random string and produces a long "pseudo-random" string.

Many pseudo-random bit generators have been proposed and discussed in prior art literature, such as the popular linear congruential bit generator. In evaluating the utility of these bit generators, the conventional approach is to subject each bit generator to a standard regimen of empirical and analytical statistical tests to determine if the generators produce acceptable random bits. Those generators that pass the standard tests are often assumed to produce sufficiently good pseudo-random bit streams for the various purposes for which they are to be employed.

However, this assumption may be erroneous. For instance, it has been shown that the linear congruential bit generator is hardly general purpose since after observing its outputs for a short period, it becomes possible to compute the future outputs correctly. It has also been shown how to predict the bits of the following generator: given a polynomial, output successive digits of the algebraic number defined by the polynomial. As another example, Monte Carlo simulations of a well-known physical system were recently shown to give results far from the known values when several well-known generators were used as input for the simulations.

While certain traditional generators may not be general purpose, they may be sufficient for certain purposes. For example, it has been shown that a few simple bit generators (including the linear congruential) are sufficient, in a rigorous sense, for a few specific applications. In short, there are examples where the traditional generators are known to be sufficient and there are examples where they are known to be insufficient. For all other cases there are no guarantees. Moreover, for complex methods and processes it is unlikely that the traditional generators will ever be proven to produce sufficiently random output.

Most recently, a different approach to pseudo-random bit generation has been developed based on the theory of "one-way" functions. For the immediate discussion, a one-way function is a function that is easy to compute but hard to invert on an overwhelming fraction of its range. With this notion in mind, a "cryptographically strong pseudo-random (CSPR) bit generator" is a generator that takes a short, truly random seed as input, then repeatedly uses a one-way function to produce a long pseudo-random string of bits such that there is no feasible technique or procedure which can distinguish between the outputs of a CSPR bit generator and a truly random string of bits. It is also known that a CSPR bit generator will pass all statistical tests whose running times are small compared to the time required to invert the one-way function. In particular, using CSPR bits rather than truly random bits in test or other application environments whose running times are small with respect to the time to invert a one-way function will not impact on the results in any demonstrable way.

In addition to the many direct applications of CSPR bit generators mentioned previously, these bit generators may be used to compute cryptographically strong pseudo-random functions (CSPR functions). These functions take two parameters, namely, a function index and a function input. For a randomly chosen fixed index, an adversary with no knowledge of the index cannot choose a function input and then predict even a single bit of the resulting function value in a feasible amount of time. This is true even if the adversary has already seen many function values for many function inputs of its choosing.

CSPR functions have several applications. Two important applications are as follows. First, they can be used in a simple protocol for identifying party A to party B over a non-secure channel when A and B share a secret key. The shared key is used as a CSPR function index. B queries any party on the channel claiming to be A with a random function input. Only A will be able to return the correct function value.

Second, CSPR functions can be used to distribute independent random bits to each of the processes in a parallel or distributed computation. A single seed is first broadcast to each process. This shared seed is used as the CSPR function index. Using its process identification number as a function input, each process computes a CSPR function value as its random seed. Each process may now use this seed and a CSPR bit generator to compute CSPR bits for its own use.

SUMMARY OF THE INVENTION

Cryptographically strong pseudo-random bit generators and functions are implemented by circuitry and concomitant methodologies which utilize secure block cypher encoders to implement a cryptographically strong pseudo-random bit generator.

Broadly, in accordance with one serial aspect of the present invention, a stream of cryptographically strong pseudo-random bits is generated from first and second seeds, of the same length, and a block cypher encoder having a fixed random encoder key. The first seed serves as the first input to the block cypher encoder. Each subsequent input to the block cypher encoder is provided as the last output of the block cypher encoder. Each bit in the stream of cryptographically strong pseudo-random bits is determined in correspondence to an inner product between the input to the block cypher encoder and the second seed.

In accordance with another serial aspect of the present invention, a stream of cryptographically strong pseudo-random bits is generated from a first seed and a plurality S of second seeds, all seeds being of the same length, and a block cypher encoder having a fixed random encoder key. The first seed serves as the first input of the block cypher encoder. Each subsequent input to the block cypher encoder is provided as the last output of the block cypher encoder. S consecutive bits in the stream of cryptographically strong pseudo-random bits are determined in correspondence to S distinct inner products between the input to the block cypher encoder and the S second seeds.

In accordance with a parallel aspect of the present invention, a stream of cryptographically strong pseudo-random bits in groups of N is generated with N block cypher encoders, each having a different fixed random key, and N first and N second seeds, all of the seeds being of the same length. Each of the first seeds serves as one input to a corresponding block cypher encoder. Each subsequent input to each encoder is provided as its last output. Output bits in each group in the stream of cryptographically strong pseudo-random random bits are determined in correspondence to an inner product between the input to each encoder and a corresponding second seed.

In accordance with another parallel aspect of the present invention, a stream of cryptographically strong pseudo-random bits in groups of NS is generated with N block cypher encoders, each having a different fixed random key, and N first and NS second seeds, all of the same length. Each of the first seeds serves as one input to a corresponding block cypher encoder. Each subsequent input to each encoder is provided as its last output. Output bits in each group in the stream of cryptographically strong pseudo-random bits are determined in correspondence to S inner products between the input to each encoder and the S second seeds.

In accordance with yet another serial aspect of the present invention, a stream of cryptographically strong pseudo-random bits is generated with two block cypher encoders, each having a different fixed random encoder key, and first and second seeds of the same length. The two block cypher encoders are connected such that the output of the first encoder serves as the input of the second encoder. Moreover, the output of the second encoder serves as the next input to the first encoder once the first seed has been processed by the first encoder. The stream of cryptographically strong pseudo-random bits is determined in correspondence to an inner product between successive inputs to the first encoder and the second seed.

In accordance with still another serial aspect of the present invention, a stream of cryptographically strong pseudo-random bits is determined with two block cypher encoders, each having a different fixed random encoder key, and a first seed and S second seeds all of the same length. The two block cypher encoders are connected such that the output of the first encoder serves as the input of the second encoder. Moreover, the output of the second encoder serves as the next input to the first encoder once the first seed has been processed by the first encoder. The stream of cryptographically strong pseudo-random bits is determined in correspondence to S inner products between successive inputs of the first encoder and the S second seeds.

In accordance with a combined serial-parallel aspect of the present invention, a stream of cryptographically strong pseudo-random bits in sets of N is generated with: N groups of two-block cypher encoders, each of the two-block encoders having a different fixed random encoder key, and N first seeds and N second seeds, all seeds being of the same length. Each of the two-block cypher encoders is connected such that the output of the first encoder serves as the input of the second encoder. Moreover, the output of the second encoder serves as the next input to the first encoder once the corresponding first seed from the N first seeds has been processed by the first encoder. Output bits in each set in the stream of cryptographically strong pseudo-random bits are determined in correspondence to N inner products between successive inputs of the first encoder of each of the two-block cypher encoders and its corresponding second seed from the N second seeds.

In accordance with another combined serial-parallel aspect of the present invention, a stream of cryptographically strong pseudo-random bits in sets of NS is generated with: N groups of two-block cypher encoders, each of the two-block encoders having a different fixed random encoder key, and N first seeds and NS second seeds all of the same length. Each of the two-block cypher encoders is connected such that the output of the first encoder serves as the input of the second encoder. Moreover, the output of the second encoder serves as the next input to the first encoder once the corresponding first seed from the N first seeds has been processed by the first encoder. Output bits in each set in the stream of cryptographically strong pseudo-random bits are determined in correspondence to NS inner products between successive inputs of the first encoder and the S second seeds corresponding to each of the N groups of two-block encoders.

In accordance with the pseudo-random function aspect of the present invention, a cryptographically strong pseudo-random function value is computed from a function index and a function input. The function index includes first and second seeds of length n and a key for a block cypher encoder. The function input is a string of length m. A bit pointer is initialized to point to the least significant bit of the function input. Each block cypher is arranged to feed back its output to its input. The current block cypher input is initially assigned to be the value of the first seed. An output stream of length 2 n is generated in correspondence to 2 n inner products between 2 n successive inputs of the block cypher encoder and the second seed. If the bit pointer does not point to the most significant bit, then one of two steps is completed, namely: (1) if the input bit in the function input pointed at by the bit pointer is a first bit value, then the first n bits of the output stream become the current cypher input; or (2) if the bit in the function input pointed at by the bit pointer is a second bit value, then the last n bits of the output stream become the current cypher input. In either case, the bit pointer is incremented, and another output stream of length 2 n is computed using the current block cypher input. If the bit pointer does point to the most significant bit, then the function value is either determined to be the first n bits of the previous output stream if the most significant bit of the function input is a first bit value, or the function value is determined to be the last n bits if the most significant bit is a second bit value.

A feature of the inventive aspects of the present invention is that CSPR functions may be based on any of the CSPR bit generators previously summarized.

The organization and operation of this invention will be understood from a consideration of the detailed description of the illustrative embodiment, which follows, when taken in conjunction with the accompanying drawing.

DETAILED DESCRIPTION

By way of introducing terminology and notation useful in elucidating the present invention, an overview discussion is first presented; following this overview, illustrative embodiments in accordance with the present invention are described.

Overview

A "feasible" computation on inputs of length M takes time proportional to M, $M^2$ or $M^C$, where C is some fixed constant. "Infeasible" computations are those that are not feasible. A function F is "one-way" if it is feasible to compute but infeasible to invert for a random element in its range. A function is a one-way "permutation" if it is one-way and, in addition, length preserving and one-to-one, that is, if $F(x)=y$, then the lengths of x and y are equal and for every y there is exactly one x. Hereafter, F will denote a one-way permutation.

Two distributions $\mu_1$, $\mu_2$ on binary strings are "indistinguishable" if any feasible computation that guesses that a given string is generated under $\mu_1$ or $\mu_2$ succeeds with probability $\frac{1}{2}+\epsilon(n)$ where $\epsilon(n)$ is negligible, that is, $\epsilon(n)=1/T(n)$ and $T(n)$ is the running time of some infeasible computation. A "cryptographically strong pseudo-random distribution" is indistinguishable from the uniform distribution.

A cryptographically strong pseudo-random bit generator G accepts a random seed x of length X and outputs a longer bit string y of length $Y=X^{O(1)}$ and the output distribution is pseudo-random. This means that even a single bit of y cannot be predicted by looking at other bits of y.

Whereas the most recent realizations disclosed in the prior art to configure cryptographically-strong pseudo-random bit generators utilize one-way functions, the subject matter in accordance with the present invention is based on a block cypher encoder—such an encoder may be realized via the Data Encryption Standard (DES), as published by the National Bureau of Standards, Department of Commerce, FIPS, pub 46, January, 1977. DES has a reasonably fast implementation and is commercially available; for example, device type VM009 available from the VLI Technology Inc. of Tempe, Ariz. implements DES. A block cypher encoder takes as input a random key k and an input string x of size X to produce an output string of size X. For a fixed key k, the output y of a block cypher encoder, denoted F(k,x), is a permutation. In addition, the present invention makes more efficient use of the input seeds than the realizations in the prior art.

Illustrative Embodiments

Figure 1:
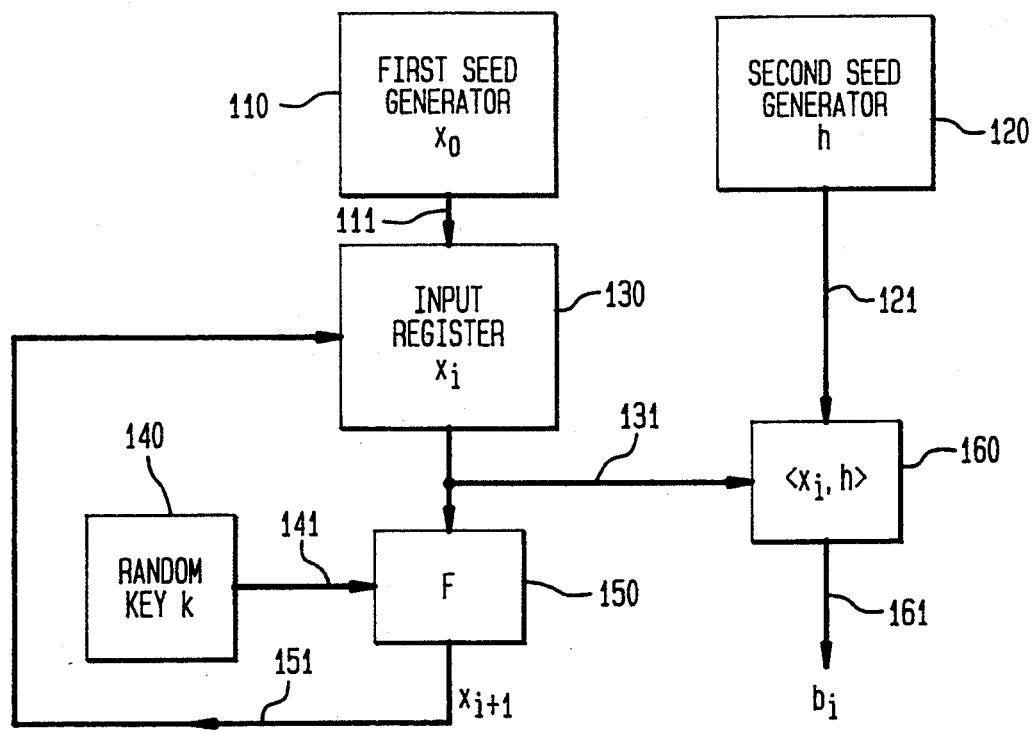
FIG. 1 is a block diagram of an illustrative serial, cryptographically strong random bit generator in accordance with the present invention.

As alluded to in the Overview, the generators of the present invention are made practical by basing them on "block cyphers" encoders. One manner in which a block cypher encoder is used as a fundamental component to construct a cryptographically strong pseudo-random bit generator is set forth with reference to FIG. 1. In FIG. 1, a serial block cypher encoder is depicted by element 150; the permutation effected by block cypher encoder 150 is denoted F. A fixed random key k, provided by random key generator 140, serves as one input to block cypher encoder 150 via bus 141. The other input to block cypher encoder is provided via bus 131 from an input register 130, which is shown as providing a set of bits denoted $x_i$ on output bus 131. Input register 130 has two inputs, namely, the first seed $x_0$ as provided by first seed generator 110 over bus 111, and the output of block encoder 150, denoted $x_{i+1}$, as provided by feedback bus 151. Input register 130 operates so that $x_i$ is first assigned the value $x_0$, whereas any the subsequent value of $x_i$ is provided by overwriting the last value of $x_i$ with the updated value $x_{i+1}$. The input $x_i$ to encoder 150 also serves as one input to inner product device 160, also via bus 131. In addition, inner product device 160 has as an input, via bus 121, the second seed h produced by second seed generator 120. In general, the length of the first and second seeds are the same. The length of the random key does not need to be the same length as the first and second seeds; the size of the random key usually depends on how the block cypher works. Inner product device 160 determines an inner product, represented by $<x_i,h>=b_i$, as follows: (a) compute the bitwise AND of $x_i$ with h; and (b) output as the inner product result the parity of all bits from the bitwise ANDing, that is, output a 0 if there are an even number of one bits, and a 1 if there are an odd number of one bits. Each $b_i$ bit is sequentially provided on output lead 161.

Figure 2:
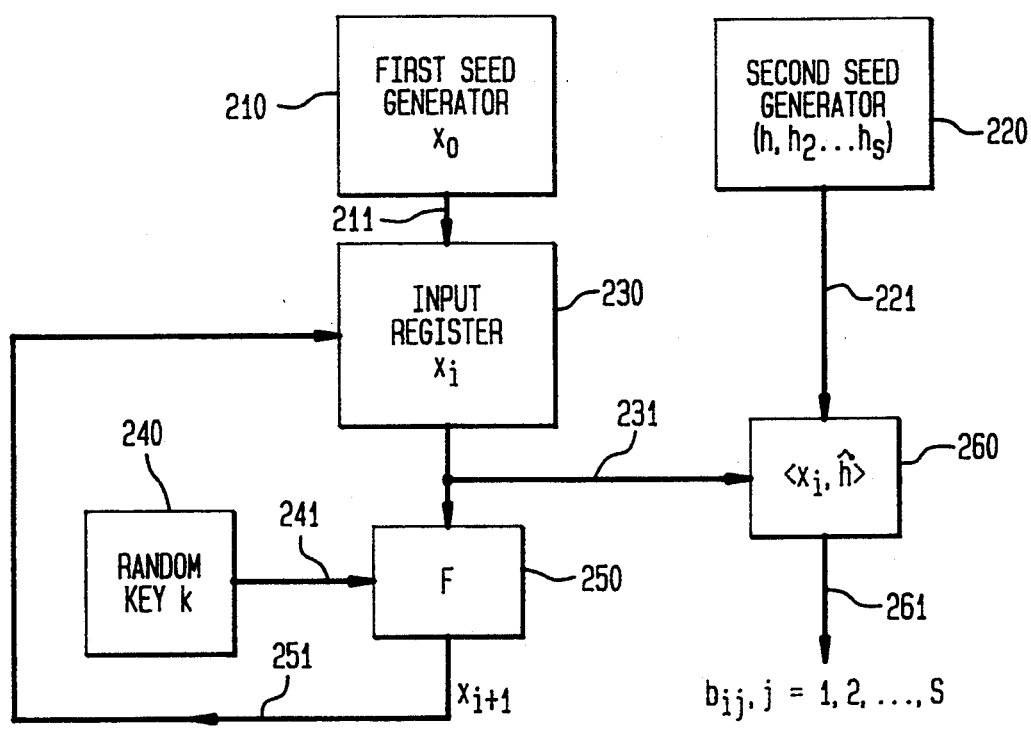
FIG. 2 is a block diagram of another illustrative serial, cryptographically strong random bit generator in accordance with the present invention.

Another embodiment in which a block cypher encoder is used as a fundamental component to construct a cryptographically strong pseudo-random bit generator is set forth with reference to FIG. 2. In FIG. 2, a serial block cypher encoder is depicted by element 250; the permutation effected by block cypher 250 is denoted F. A fixed random key k, provided by random key generator 240, serves as one input to block cypher encoder 250 via bus 241. The other input to block cypher encoder is provided via bus 231 from an input register 230, which is shown as providing a set of bits denoted $x_i$ on output bus 231. Input register 230 has two inputs, namely, the first seed $x_0$ as provided by first seed generator 210 over bus 211, and the output of block encoder 250, denoted $x_{i+1}$, as provided by feedback bus 251. Input register 230 operates so that $x_i$ is first assigned the value $x_0$, whereas any the subsequent value of $x_i$ is provided by overwriting the last value of $x_i$ with the updated value $X_{i+1}$. The input $x_i$ to encoder 250 also serves as one input to inner product device 260, also via bus 231. In addition, inner product device 260 has as inputs, via bus 221, the S second seeds $h_1, h_2, \ldots, h_S$ produced by second seed generator 220. In general, the length of the first seed, the S seeds, and the random key are all the same. Inner product device 260 determines, during the $i^{th}$ cycle, a set of S inner products, the set being represented by $\{<x_i,h_1>, <x_i,h_2>, \ldots, <x_i,h_S>\}$ (or as $<x_i,h>$ in compact notation), as follows: (a) compute the bitwise AND of $x_i$ with $h_j$, $j=1, 2, \ldots, S$; and (b) output as the $j^{th}$ inner product result the parity of all bits from the bitwise ANDing, that is, output a 0 if there are an even number of one bits, and a 1 if there are an odd number of one bits. The result of the $j^{th}$ inner product is a bit, denoted $b_j$, which is the $j^{th}$ bit in the set of S consecutive bits that compose the stream of cryptographically strong pseudo-random bits that appear on output bus 261 of inner product device 260.

Another way to represent the output on bus 261 for the $i^{th}$ cycle is $b_{ij}$, $j = 1, 2, \ldots, S$, as depicted in FIG. 2

Figure 3:
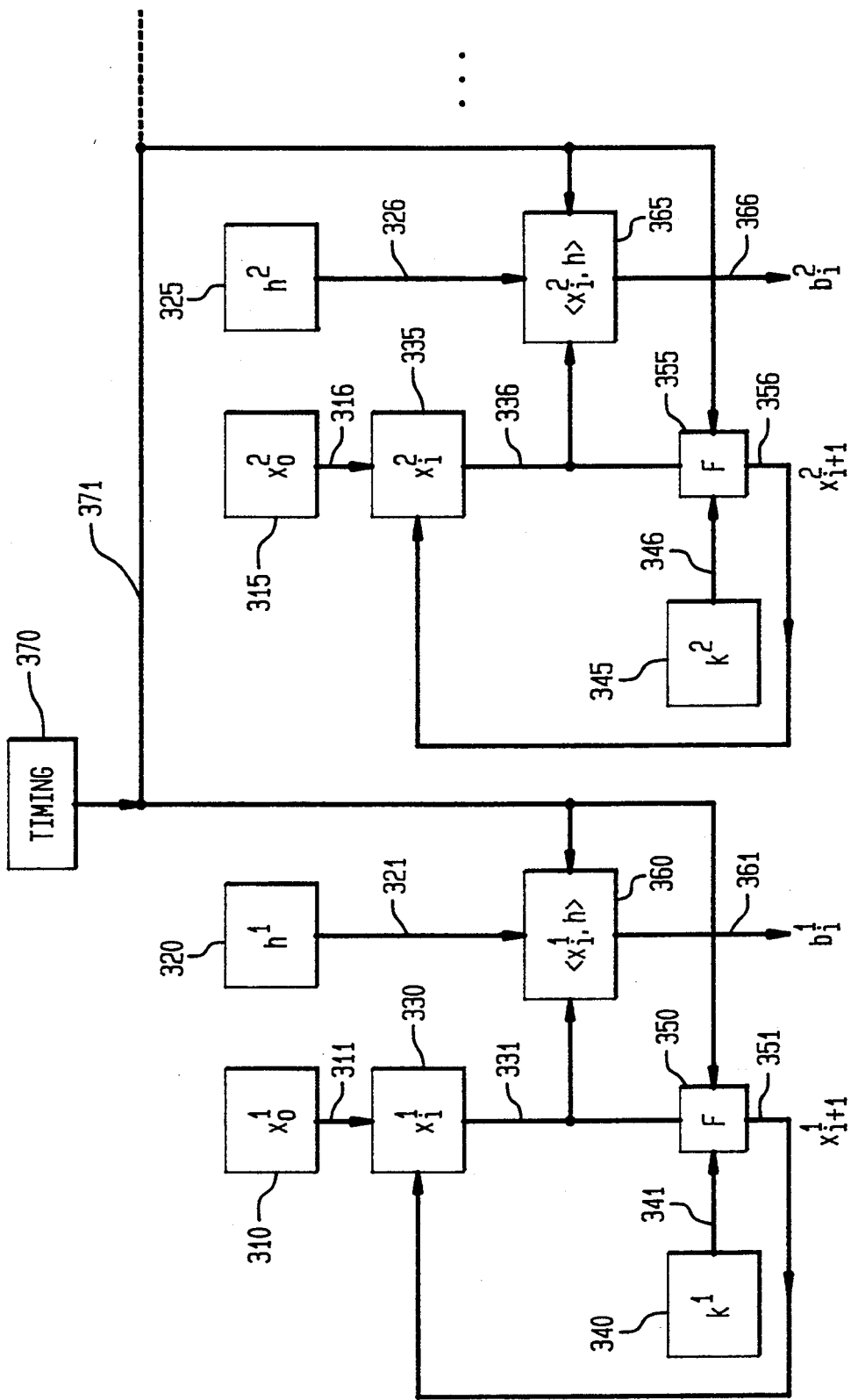
FIG. 3 is a block diagram of an illustrative parallel, cryptographically strong random bit generator in accordance with the present invention.

Yet another manner in which a block cypher encoders are used as fundamental components to construct a cryptographically strong pseudo-random bit generator is set forth with reference to FIG. 3. In FIG. 3, one block cypher encoder in an arrangement of parallel block cypher encoders 350, 355, . . . is depicted by element 350; the permutation effected by each block cypher encoder is denoted F. Elements 310, 320, 330, 340, 350, and 360 in FIG. 3 operate in the same manner as described with respect to elements 110, 120, 130, 140, 150, and 160 in FIG. 1. Similarly, elements 315, 325, 335, 345, 355, and 365 in FIG. 3 operate in the same manner as described with respect to elements 110, 120, 130, 140, 150, and 160 in FIG. 1; and so forth for the remaining encoders (not shown).

In particular, fixed random key $k_1$, provided by random key generator 340, serves as one input to block cypher encoder 350 via bus 341. The other input to block cypher encoder is provided via bus 331 from an input register 330, which is shown as providing a set of bits denoted $x_i^1$ on output bus 331. Input register 330 has two inputs, namely, the first seed $x_0^1$ as provided by first seed generator 310 over bus 311, and the output of block encoder 350, denoted $x_{i+1}^1$, as provided by feedback bus 351. Input register 330 operates so that $x_i^1$ is first assigned the value $x_0^1$, whereas any the subsequent value of $x_i^1$ is provided by overwriting the last value of $x_i^1$ with the updated value $x_{i+1}^1$. The input $x_i^1$ to encoder 350 also serves as one input to inner product device 360, also via bus 331. In addition, inner product device 360 has as an input, via bus 321, the second seed $h^1$ produced by second seed generator 320. In general, the length of the first $x_0^1$ and second $h^1$ seeds and the random key $k^1$ are the same. Inner product device 360 determines an inner product, represented by $<x_i^1, h> \equiv b_i^1$, as follows: (a) compute the bitwise AND of $s_i^1$ with $h^1$; and (b) output as the inner product result the parity of all bits from the bitwise ANDing, that is, output a 0 if there are an even number of one bits, and a 1 if there are an odd number of one bits. Each $b_i^1$ bit is provided on output lead 361.

In addition, fixed random key $k_2$, provided by random key generator 345, serves as one input to block cypher encoder 355 via bus 346. The other input to block cypher encoder is provided via bus 336 from an input register 335, which is shown as providing a set of bits denoted $x_i^2$ on output bus 336. Input register 335 has two inputs, namely, the first seed $x_0^2$ as provided by first seed generator 315 over bus 316, and the output of block encoder 355, denoted $x_{i+1}^2$, as provided by feedback bus 356. Input register 335 operates so that $x_i^2$ is first assigned the value $x_0^2$ whereas any the subsequent value of $x_i^2$ is provided by overwriting the last value of $x_i^2$ with the updated value $x_{i+1}^2$. The input $x_i^2$ to encoder 355 also serves as one input to inner product device 365, also via bus 335. In addition, inner product device 365 has as an input, via bus 326, the second seed $h^2$ produced by second seed generator 325. In general, the length of the first $x_0^1$ and second $h^2$ seeds and the random key $k^2$ are the same. Inner product device 365 determines an inner product, represented by $<x_i^2, h> \equiv b_i^2$, as follows: (a) compute the bitwise AND of $s_i^2$ with $h^1$; and (b) output as the inner product result the parity of all bits from the bitwise ANDing, that is, output a 0 if there are an even number of one bits, and a 1 if there are an odd number of one bits. Each $b_i^2$ bit is provided on output lead 361.

Finally, to control the production of the parallel bits $b_i^1$, $b_1^2$, . . . during the $i^{th}$ cycle, timing device 370 is coupled to each block cypher encoder 330, 335, . . . and each inner product device 360, 365, . . . to output the parallel bits during a desired cycle time interval.

Figure 4:
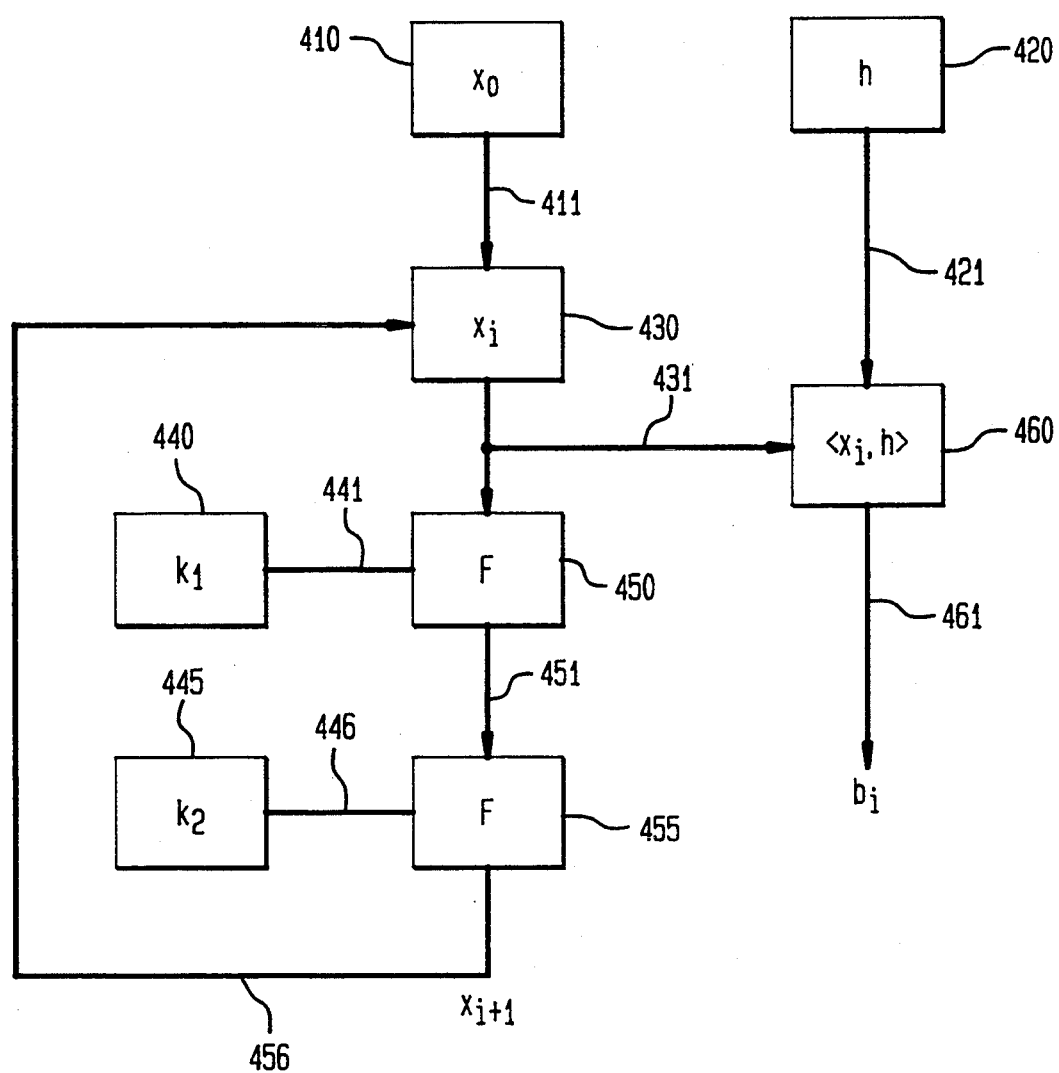
FIG. 4 is a block diagram of another illustrative serial, secure, cryptographically strong random bit generator in accordance with the present invention.

All of the above implementations have considered feeding back the output of a given block cypher encoder to its input to provide what is, in effect, a sequence of random seeds for processing. To provide an added measure of security, the implementation of FIG. 4 is employed. In particular, with reference to FIG. 4, two block cypher encoders 450 and 455 are used as fundamental components to construct a cryptographically strong pseudo-random bit generator. In FIG. 4, a first block cypher encoder is depicted by element 450 and a second block cypher encoder is depicted by element 455; the permutation effected by each block cypher encoder is denoted F. The output of block cypher encoder 450 is connected to the input of block cypher encoder via bus 451. A first fixed random key $k_1$, provided by random key generator 440, serves as one input to block cypher encoder 450 via bus 441. A second fixed random key $k_2$, provided by random key generator 445, serves as one input to block cypher encoder 455 via bus 446. The other input to block cypher encoder is provided via bus 431 from an input register 430, which is shown as providing a set of bits denoted $x_i$ on output bus 431. Input register 430 has two inputs, namely, the first seed $x_0$ as provided by first seed generator 410 over bus 411, and the output of block encoder 455, denoted $x_{i+1}$, as provided by feedback bus 456. Input register 430 operates so that $x_i$ is first assigned the value $x_0$, whereas any the subsequent value of $x_i$ is provided by overwriting the last value of $x_i$ with the updated value $x_{i+1}$. The input $x_i$ to encoder 450 also serves as one input to inner product device 460, also via bus 431. In addition, inner product device 460 has as an input, via bus 421, the second seed h produced by second seed generator 420. In general, the length of the first and second seeds and the random keys $k_1$ and $k_2$ are the same. Inner product device 460 determines an inner product, represented by $<x_i, h> \equiv b_i$, as follows: (a) compute the bitwise AND of $x_i$ with h; and (b) output as the inner product result the parity of all bits from the bitwise ANDing, that is, output a 0 if there are an even number of one bits, and a 1 if there are an odd number of one bits. Each $b_i$ bit is sequentially provided on output lead 461.

It is clear to one with ordinary skill in the art that, because of the teachings with respect to the embodiment of FIG. 2, that seeds $h^1$, $h^2$, . . . in FIG. 3 or the seed h in FIG. 4 may be replaced by a plurality of seeds (e.g., for $h^1 \rightarrow h_1^1, h_2^1, \ldots$) so that a multiple number of bits per inner product per cycle would be generated. It is also clear that the two-block encoder of FIG. 4 may be combined with the embodiments that teach a single block encoder to yield combined serial-parallel variations on the generation of streams of cryptographically strong pseudo-random output bits.

Embodiment for Pseudo-Random Functions

Let G() designate a CSPR bit generator which, as in the foregoing section, takes as input strings x, k and h, where x and h are n bit strings. Let H() designate a CSPR function. G() will be used in order to compute H(). In fact, the inputs of G(), the strings x, k, and h, are together the function index of H(). Let the function input of H() be denoted d, an m bit string. For the sake of this description of H(), G() outputs a string of length 2 n. The first n bits are designated y__0 and the second n bits are y__1. Let bit (d,i) (which is shorthand notation for a bit pointer) be the $i^{th}$ bit of function input. H(x,k,h,d) is computed as follows:

1. x__0=x.
2. for i=1 to m,
   a. compute G(x__(i−1),k,h)=y__0 y__1
   b. if bit(d,i)=0, then x__i=y__0, else if bit(d,i)=1, then x__i=y__1
   c. output x__m.

The above technique for determining H(x,k,h,d) has been described with reference to the most basic generator G() as described with respect to FIG. 1. It is also clear that the other CSPR bit generators disclosed herein, such as represented by FIG. 2, 3 or 4, or combinations thereof, can be used to compute a CSPR function with only minor modifications to the above scheme.

It is to be understood that the above-described embodiment is simply illustrative of the principles in accordance with the present invention. Other embodiments may be readily devised by those skilled in the art which may embody the principles in spirit and scope. Thus, it is to be further understood that the circuit arrangements described herein are not limited to the specific forms shown by way of illustration, but may assume other embodiments limited only by the scope of the appended claims.

What is claimed is:

1. A method for generating a stream of cryptographically strong pseudo-random bits with: a block cypher encoder having a fixed random encoder key; and first and second seeds of the same length, the method comprising the steps of
   (a) inputing the first seed as the first input to the block cypher encoder,
   (b) generating an output bit in the stream in correspondence to an inner product between the input of the block cypher encoder and the second seed, and
   (c) feeding back the output of the block cypher encoder as the next input to the block cypher encoder, and returning to step (b).

2. The method as recited in claim 1 wherein said step of generating said output bit includes the steps of
   bitwise ANDing the input of the block cypher encoder and the second seed, and
   outputting the parity of said bitwise ANDing step as said output bit.

3. A method for generating a stream of cryptographically strong pseudo-random bits with: a block cypher encoder having a fixed random encoder key; and a first seed and S second seeds all of the same length, the method comprising the steps of
   (a) inputing the first seed as the first input to the block cypher encoder,
   (b) generating S output bits in the stream in correspondence to S inner products between the input of the block cypher encoder and the S second seeds, and
   (c) feeding back the output of the block cypher encoder as the next input to the block cypher encoder, and returning to step (b).

4. The method as recited in claim 3 wherein said step of generating said S output bits includes the steps of
   bitwise ANDing the input of the block cypher encoder and a corresponding one of the S second seeds, and
   outputting the parity of said bitwise ANDing step as the corresponding one of said S output bits.

5. A method for generating a stream of cryptographically strong pseudo-random bits in groups of N with: N block cypher encoders wherein each of the encoders has a different fixed random key; and N first and N second seeds, all of the same length, the method comprising the steps of
   (a) inputing the first seed I, I=1, 2, ..., N, as the first input to the corresponding encoder I,
   (b) concurrently generating the output bit I in each group in correspondence to an inner product between the input to the encoder I and the corresponding second seed I, and
   (c) feeding back the output of each encoder I as its next input, and returning to step (b).

6. The method as recited in claim 5 wherein said step of generating the output bit I includes the steps of
   bitwise ANDing the input of the encoder I and the second seed I, and
   outputting the parity of the bitwise ANDing step as the output bit I.

7. A method for generating a stream of cryptographically strong pseudo-random bits in groups of NS with: N block cypher encoders wherein each of the encoders has a different fixed random key; N first and NS second seeds, all of the same length, the method comprising the steps of
   (a) inputing the first seed I, I=1, 2, ..., N, as the first input to the corresponding encoder I,
   (b) concurrently generating the output bits I,J, J=1, 2, ..., S, in each group of NS bits in correspondence to an inner product between the input to the encoder I and the corresponding second seed I,J, and
   (c) feeding back the output of each encoder I as its next input, and returning to step (b).

8. The method as recited in claim 7 wherein said step of generating said output bits I,J, J=1, 2, ..., S includes the steps of
   bitwise ANDing the input of the encoder I and the second seed I,J, J=1, 2, ..., S, and
   outputting the parity of the bitwise ANDing step as the output bits I,J, J=1, 2, ..., S.

9. A method for generating a stream of cryptographically strong pseudo-random bits with: two block cypher encoders wherein the fixed random encoder key is different for each of the encoders; and first and second seeds of the same length, the method comprising the steps of
   (a) interconnecting the two block cypher encoders such that the output of the first encoder serves as the input to the second encoder,
   (b) inputing the first seed as the first input to the first encoder,
   (c) generating an output bit in the stream in correspondence to an inner product between the input of the first encoder and the second seed, and
   (d) feeding back the output of the second encoder as the next input to the first encoder, and returning to step (c).

10. The method as recited in claim 9 wherein said step of generating said output bit includes the steps of
    bitwise ANDing the input of the first encoder and the second seed, and outputting the parity of said bitwise ANDing step as said output bit.

11. A method for generating a stream of cryptographically strong pseudo-random bits with: two block cypher encoders wherein the fixed random encoder key is different for each of the encoders; and a first seed and S second seeds all of the same length, the method comprising the steps of
(a) interconnecting the two block cypher encoders such that the output of the first encoder serves as the input of the second encoder,
(b) inputing the first seed as the first input of the first encoder,
(c) generating S output bits in the stream in correspondence to S inner products between the input of the first encoder and the S second seeds, and
(d) feeding back the output of the second encoder as the next input to the first encoder, and returning to step (c).

12. The method as recited in claim 11 wherein said step of generating said S output bits includes the steps of
bitwise ANDing the input of the first encoder and a corresponding one of the S second seeds, and
outputting the parity of said bitwise ANDing step as the corresponding one of said S output bits.

13. A method for generating a stream of cryptographically strong pseudo-random bits in sets of N with: a plurality N of two-block cypher encoders wherein the fixed random encoder key is different for each of the encoders in the two-block encoders; and N first seeds and N second seeds all of the same length, the method comprising the steps of
(a) interconnecting each of the two-block encoders such that the output of the first encoder serves as the input of the second encoder,
(b) inputing the first seed I, I=1,2, ..., N as the first input to the corresponding first encoder of two-block encoder I,
(c) concurrently generating the output bit I in a corresponding one of the sets in correspondence to an inner product between the input to the two-block encoder I and the corresponding second seed I, and
(d) feeding back the output of each second encoder of the two-block encoder I as the next input to the first encoder of the two-block encoder I, and returning to step (c).

14. The method as recited in claim 13 wherein said step of generating the output bit I includes the steps of
bitwise ANDing the input to the first encoder of the two-block encoder I and the corresponding second seed I, and
outputting the parity of the bitwise ANDing step as said output bit I.

15. A method for generating a stream of cryptographically strong pseudo-random bits in sets of NS with: a plurality N of two-block cypher encoders wherein the fixed random encoder key is different for each of the encoders in the two-block encoders; and N first seeds and NS second seeds all of the same length, the method comprising the steps of
(a) interconnecting each of the two-block encoders such that the output of the first encoder serves as the input of the second encoder,
(b) inputing the first seed I, I=1,2, ..., N as the first input to the corresponding first encoder of two-block encoder I,
(c) concurrently generating the output bits I,J, J=1,2, ..., S, in a corresponding one of the sets of NS bits in correspondence to an inner product between the input to the first encoder of the two-block encoder I and the corresponding second seed I,J and
(d) feeding back the output of each second encoder of each two-block encoder I as the next input to the first encoder of each two-block encoder I, and returning to step (c).

16. The method as recited in claim 15 wherein said step of generating said output bits I,J, J=1, 2, ..., S includes the steps of
bitwise ANDing the input of the two-block encoder I and the second seed I,J, J=1, 2, ..., S, and
outputting the parity of the bitwise ANDing step as the output bits I,J, J=1, 2, ..., S.

17. A method for generating a cryptographically strong pseudo-random function wherein a function index is composed of first and second seeds each of length n and a key for a block cypher encoder, wherein the input to the function is composed of an m bit string, the method comprising the steps of
(a) feeding back the output of the block cypher encoder to the input of the block cypher encoder,
(b) inputing the key to the block cypher encoder and identifying a current seed as the initial first seed,
(c) initializing a bit pointer to point to the least significant bit of the function input,
(d) inputing the current seed to the block cypher encoder and generating an output stream of length 2 n bits in correspondence to 2 n inner products between the 2 n successive inputs of the block cypher encoder and the second seed,
(e) if the bit pointer does not point to the most significant bit, continuing with step (f); otherwise, proceeding to step (h),
(f) if the bit in the function input pointed at by the bit pointer is a first bit value, selecting the first n bits of the output stream as the current seed to the block cypher encoder, incrementing the bit pointer, and returning to step (d),
(g) if the bit in the function input pointed at by the bit pointer is a second bit value, selecting the last n bits of the output stream as the current seed to the block cypher encoder, incrementing the bit pointer, and returning to step (d),
(h) if the most significant bit in the function input is a first bit value, selecting the first n bits of the output stream as the function value, or
(i) if the most significant bit in the function input is a second bit value, selecting the last n bits of the output stream as the function value.

18. Circuitry for generating a stream of cryptographically strong pseudo-random bits utilizing first and second seeds of the same length, the circuitry comprising
a block cypher encoder having a fixed random encoder key,
means, coupled to the input to said block cypher encoder, for inputing the first seed as the first input to said block cypher encoder,
means, coupled to the input of said said block cypher encoder, for generating an output bit in the stream in correspondence to an inner product between the input of said block cypher encoder and the second seed, and
means, coupled to the input and output of said block cypher encoder, for feeding back the output of said block cypher encoder to the input of the block cypher encoder.

19. The circuitry as recited in claim 18 wherein means for generating said output bit includes
   means, coupled to the input of said block cypher encoder, for bitwise ANDing the input of said block cypher encoder and the second seed, and
   means, coupled to said means for bitwise ANDing, for determining the parity of the output of said means for bitwise ANDing and for outputting said parity as said output bit.

20. Circuitry for generating a stream of cryptographically strong pseudo-random bits utilizing a first seed and S second seeds all of the same length, the circuitry comprising
   a block cypher encoder having a fixed random encoder key,
   means, coupled to the input of said block cypher encoder, for inputting the first seed as the first input to said block cypher encoder,
   means, coupled to the input of said block cypher encoder, for generating S output bits in the stream in correspondence to S inner products between the input of said block cypher encoder and the S second seeds, and
   means, coupled to the input and output of said block cypher encoder, for feeding back the output of said block cypher encoder to the input of said block cypher encoder.

21. The circuitry as recited in claim 20 wherein said means for generating said S output bits includes
   means, coupled to the input of said block cypher encoder, for bitwise ANDing the input of the block cypher encoder and a corresponding one of the S second seeds, and
   means, coupled to said means for bitwise ANDing, for determining the parity of the output of said means for bitwise ANDing and for outputting said parity as the corresponding one of said S output bits.

22. Circuitry for generating a stream of cryptographically strong pseudo-random bits in groups of NS utilizing N first and NS second seeds, all of the same length, the circuitry comprising
   N block cypher encoders wherein each of the encoders has a different fixed random key,
   means, coupled to the inputs of said N block cypher encoders, for inputting the first seed I, I=1, 2, ..., N, as the first input to the corresponding encoder I,
   means, coupled to the inputs of each of said N block cypher encoders, for concurrently generating the output bits I,J, J=1, 2, ..., S, in each group of NS bits in correspondence to an inner product between the input to each encoder I and the corresponding second seed I,J, and
   means, coupled to the input and output of each of said encoders, for feeding back the output of each encoder I as its next input.

23. The circuitry as recited in claim 22 said means for generating said output bits I,J, J=1, 2, ..., S includes
   means, coupled to the input of said encoders, for bitwise ANDing the input of the encoder I and the second seed I,J, J=1, 2, ..., S, and
   means, coupled to said means for bitwise ANDing, for outputting the parity of the bitwise ANDing means as the output bits I,J, J=1, 2, ..., S.

24. Circuitry for generating stream of cryptographically strong pseudo-random bits utilizing first and second seeds of the same length, the circuitry comprising
   two block cypher encoders wherein the fixed random encoder key is different for each of the encoders,
   means, coupled to the two encoders, for interconnecting the two encoders such that the output of the first encoder serves as the input of the second encoder,
   means, coupled to the first encoder, for inputting the first seed as the first input of the first encoder,
   means, coupled to the first encoder, for generating an output bit in the stream in correspondence to an inner product between the input of the first encoder and the second seed, and
   means, coupled to said encoders, for feeding back the output of the second encoder as the subsequent input the the first encoder.

25. The circuitry as recited in claim 24 wherein means for generating said output bit includes
   means, coupled to the input of the first encoder, for bitwise ANDing the input of the first encoder and the second seed, and
   means, coupled to said means for bitwise ANDing, for determining the parity of the output of said means for bitwise ANDing and for outputting said parity as said output bit.

26. Circuitry for generating a stream of cryptographically strong pseudo-random bits utilizing a first seed and S second seeds all of the same length, the circuitry comprising
   two block cypher encoders wherein the fixed random encoder key is different for each of the encoders,
   means, coupled to the two encoders, for interconnecting the two encoders such that the output of the first encoder serves as the input of the second encoder,
   means, coupled to the first encoder, for inputting the first seed as the first input of the first encoder,
   means, coupled to the first encoder, for generating S output bits in the stream in correspondence to S inner products between the input of the first encoder and the S second seeds, and
   means, coupled to said encoders, for feeding back the output of the second encoder as the subsequent input the the first encoder.

27. The circuitry as recited in claim 26 wherein said means for of generating said S output bits includes
   means, coupled to the first encoder, for bitwise ANDing the input of the first encoder and a corresponding one of the S second seeds, and
   means, coupled to said means for bitwise ANDing, for determining the parity resulting from each corresponding bitwise ANDing and for outputting the parity of each bitwise ANDing as the corresponding one of said S output bits.

28. Circuitry for generating stream of cryptographically strong pseudo-random bits in sets of N utilizing N first seeds and N second seeds all of the same length, the circuitry comprising
   a plurality N of two-block cypher encoders wherein for each of the two-block encoders the fixed random encoder key is different for each of the encoders in the two-block encoders,
   means, coupled to the N two-block encoders, for interconnecting each of the two-block encoders such that the output of the first encoder serves as the input of the second encoder,
   means, coupled to the N two-block encoders, for inputting the first seed I, I=1,2, ..., N as the first input to the corresponding first encoder of two-block encoder I, means, coupled to the input of the first encoder of each encoder I, for concurrently generating the output bit I in each of the sets in correspondence to an inner product between the input to the two-block encoder I and the corresponding second seed I, and means, coupled to each two-block encoder I, for feeding back the output of the second encoder of each two-block encoder I as the next input to the first encoder of each two-block encoder I.

29. The circuitry as recited in claim 28 wherein means for generating the output bit I includes means, coupled to the first encoder of each two-block encoder I, for bitwise ANDing the input to the first encoder of the two-block encoder I and the corresponding second seed I, and means, coupled to said means for bitwise ANDING, for outputting the parity of the bitwise ANDing means as the output bit I.

30. Circuitry for generating stream of cryptographically strong pseudo-random bits in sets of NS utilizing N first seeds and NS second seeds all of the same length, the circuitry comprising a plurality N of two-block cypher encoders wherein for each of the two-block encoders the fixed random encoder key is different for each of the encoders in the two-block encoders, means, coupled to the N two-block encoders, for interconnecting each of the two-block encoders such that the output of the first encoder serves as the input of the second encoder, means, coupled to the N two-block encoders, for inputing the first seed I, I=1,2, . . . , N as the first input to the corresponding first encoder of two-block encoder I, means, coupled to the input of the first encoder of each encoder I, for concurrently generating the output bits I,J, J=1,2, . . . , S, in each of the sets of NS bits in correspondence to an inner product between the input to the first encoder of the two-block encoder I and the corresponding second seed I,J and means, coupled to each two-block encoder I, for feeding back the output of each second encoder of each two-block encoder I as the next input to the first encoder of each two-block encoder I.

31. The circuitry as recited in claim 30 wherein said means for generating said output bits I,J, J=1, 2, . . . , S includes means, coupled to the first encoder of each two-block encoder I, for bitwise ANDing the input to the first encoder of each two-block encoder I and the second seed I,J, J=1, 2, . . . , S, and means, coupled to said means for bitwise ANDing, for outputting the parity of the bitwise ANDing means as the output bits I,J, J=1, 2, . . . , S.

* * * * *